(No Model.) 2 Sheets—Sheet 1.
G. GEIST.
WHEAT HULLING MACHINE.
No. 418,175. Patented Dec. 31, 1889.
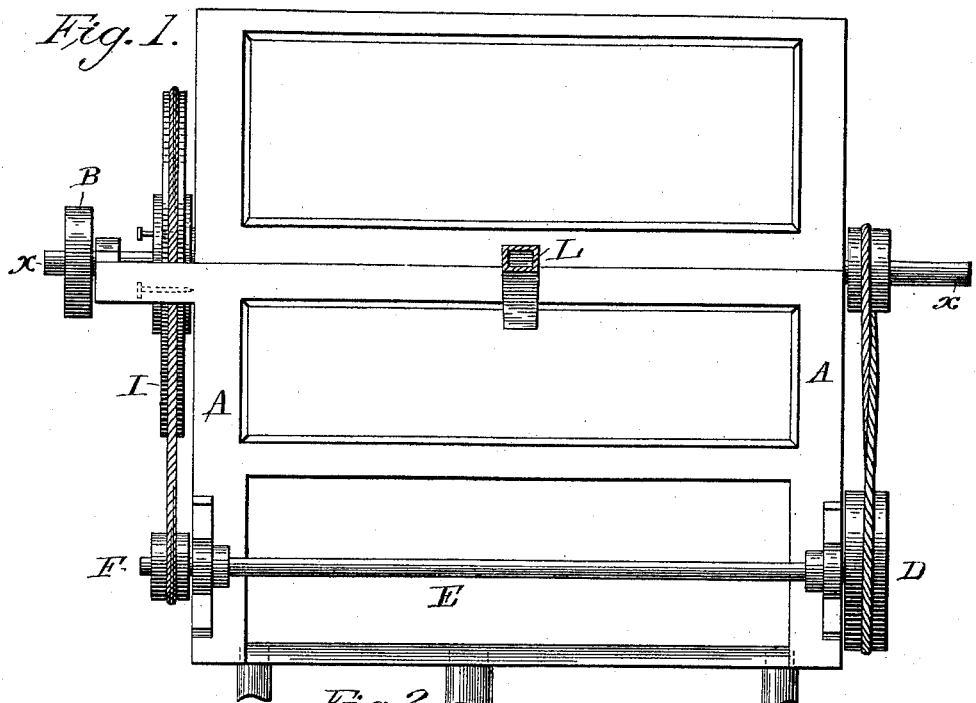
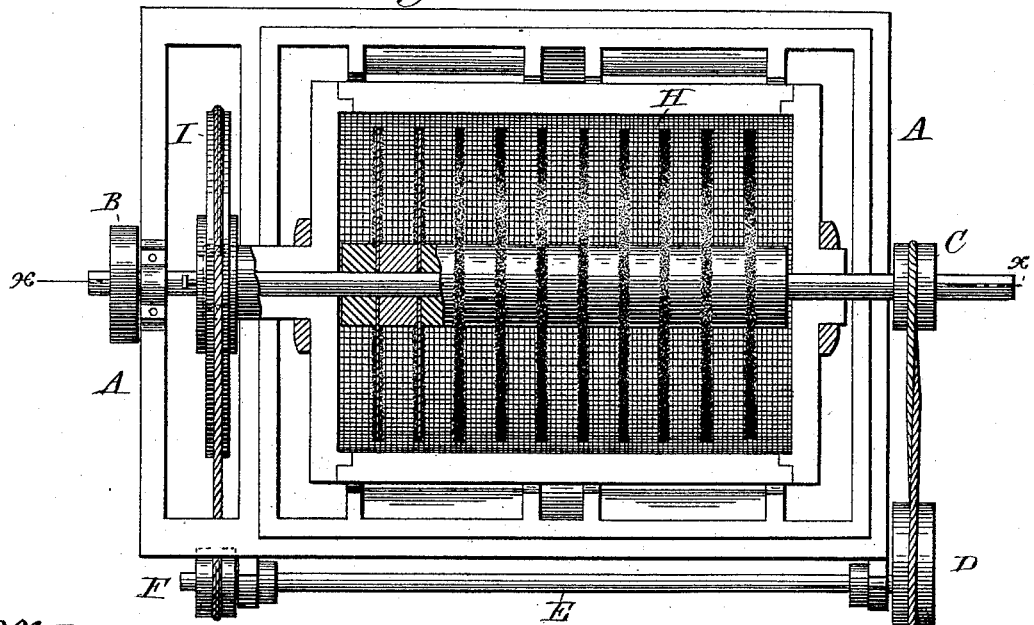
Witnesses:
R. Thompson
C. Benzel
Inventor:
Gottfried Geist (No Model.) 2 Sheets—Sheet 2.

G. GEIST.
WHEAT HULLING MACHINE.

No. 418,175. Patented Dec. 31, 1889.

Witnesses:
R. Thompson
A. Benzel

Inventor:
Gottfried Geist

UNITED STATES PATENT OFFICE.

GOTTFRIED GEIST, OF HASTINGS, NEBRASKA.

WHEAT-HULLING MACHINE.

SPECIFICATION forming part of Letters Patent No. 418,175, dated December 31, 1889.

Application filed May 1, 1889. Serial No. 309,316. (No model.)

*To all whom it may concern:*

Be it known that I, GOTTFRIED GEIST, a citizen of the United States, residing at Hastings, in the State of Nebraska, have invented a new and useful Wheat-Hulling Machine, of which the following is a specification.

The purpose of my machine is the removal from grains of wheat (or similar grain) of the outside shell, including the dust and other impurities which are found in wheat, collected especially at the hairy top of each grain, thus preparing the wheat more perfectly for being ground into flour. I attain this object by the mechanism illustrated in the accompanying drawings, in which—

Figure 3:
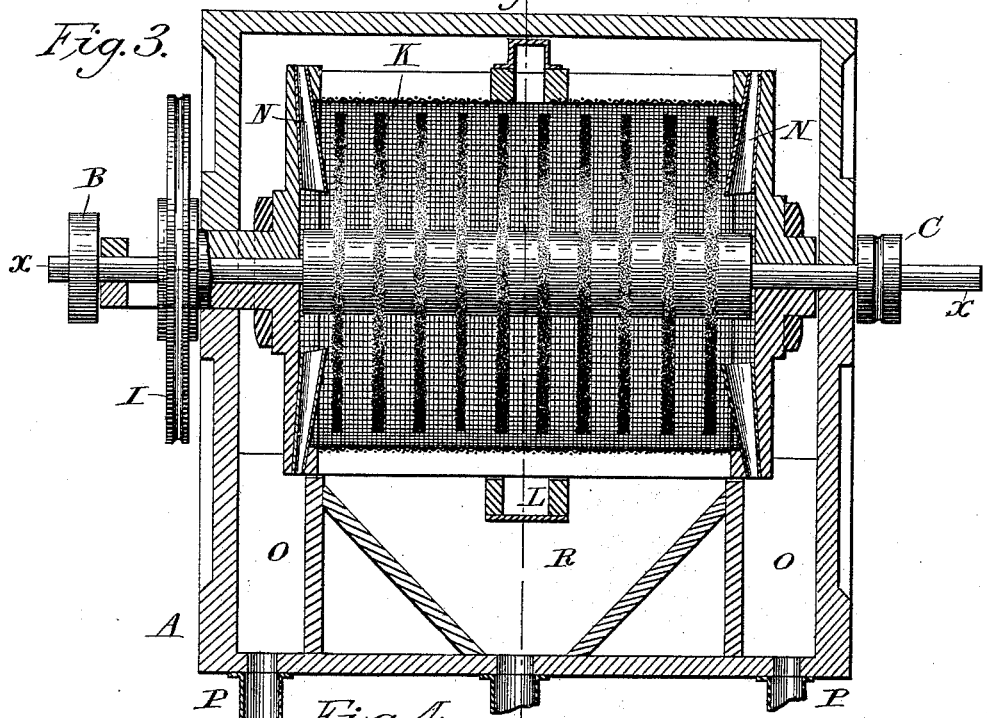

Figure 1 is a general view from one side when the machine is in running order. Fig. 2 shows the machine as seen from above, the lid being removed; Fig. 3, another side view, the side boards removed; and Fig. 4, a similar view from one end.

Similar letters refer to similar parts throughout the several views.

The strong box A constitutes the framework, which incloses or to which are attached all the other parts. Main pulley B is connected by belt with driving-shaft of engine and is attached to main shaft X. On other end of shaft X is attached pulley C, whence an opposite motion is communicated by crossed belt to larger pulley D below, which turns the shaft E (outside of structure) and with it the smaller pulley F. From pulley F motion is carried by belt to wire-gauze of cylinder H through larger pulley I. Cylinder H, with its larger pulley I, thus revolves on shaft X as a wheel does on an axle, only in this case the axle revolves also and in an opposite direction and much more rapidly.

To "axle" or shaft X are firmly attached ten iron disks K at uniform intervals along the axle. The diameter of the disks is two inches less than the diameter of the cylinder in which they revolve, thus leaving a space of one inch between circumference of disk and inside of gauze cylinder H. Said iron or steel disks are covered over with a gritty coating of cement, composed of potassium silicate, fluor-spar, red bole, pumice-stone, pulverized glass, and emery, which makes of them artificial burr-stones in the following proportions, to wit:

| | |
|---|---|
| Potassium silicate | .20 |
| Fluor-spar | .40 |
| Red bole | .03 |
| Pumice-stone | .01 |
| Pulverized glass | .02 |
| Emery | .34 |
| | 100 |

Figure 4:
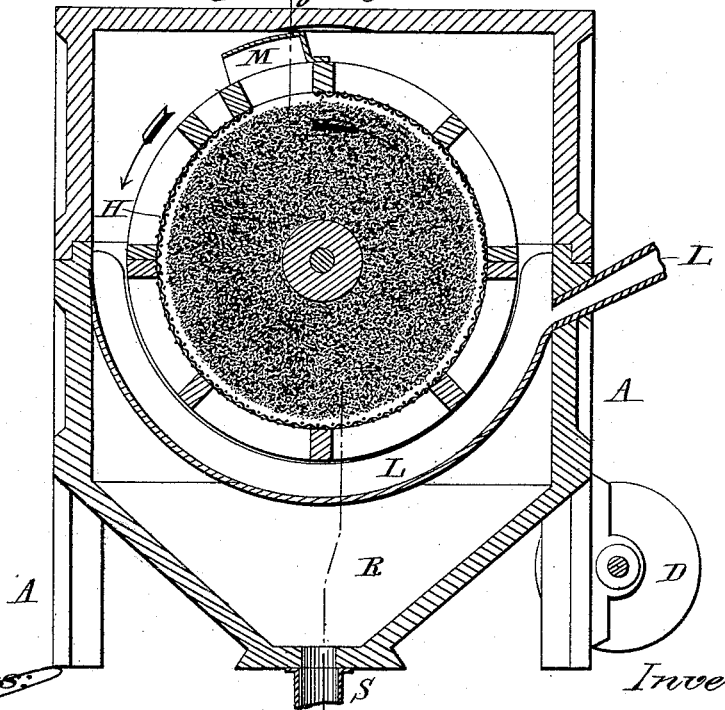

L, Fig. 4, is a pipe receiving the wheat, and is continuous in a half-circle under the cylinder H. Through this pipe L sweeps the scoop M, Fig. 4, attached as a gate to the cylinder.

N N N N in Fig. 3 are tin pipes attached inside of ends of cylinder, extending to within three inches of the central axis and communicating at the other end with chamber O and exit-pipe P. Chamber R communicates with contents of cylinder above through the meshes of gauze and below with exit-pipe S.

I will now describe the operation of the machine in systematic order. The grain enters at L, Fig. 4, and descends the pipe L L. The scoop M passes through the pipe, carrying with it the grain, until it reaches the highest point, when the wheat drops into gauze cylinder H. The slow motion of the cylinder constantly bears grain upward, while at the same time the rough disks revolve rapidly in the opposite direction, sweeping through the mass of grain. The double motion causes grain to impinge on the rough disks, filing off the hull, hair, and dirt, which all pass out of the cylinder by centrifugal force through the wire screen and are dropped in chamber R below, while the wheat is retained and is forced from middle of cylinder to both ends, crowding the one inch of space, and having passed the gauntlet of intervening disks finds exit only through pipes N, Fig. 3, into chamber O and both ends of the machine.

While the idea of hulling wheat previous to crushing it for flour is not new, yet I claim the following points as accomplished by my device and desire to secure them by Letters Patent:

The combination of the revolving shaft, the disks mounted thereon, the revolving gauze cylinder provided with the scoop or shovel M at the middle, and the radial exit-pipes N at the end, and the semicircular supply pipe or trough L.

GOTTFRIED GEIST.

Witnesses:
CHRIS HOEPPNER,
M. STARR.